United States Patent [19]

Gaworowski et al.

[11] 4,093,487
[45] June 6, 1978

[54] METHOD OF CONTINUOUSLY MAKING A PRINTING BLANKET CONSTRUCTION

[75] Inventors: Andrew J. Gaworowski, Waynesville; Wayne W. Easley, Clyde, both of N.C.

[73] Assignee: Dayco Corporation, Dayton, Ohio

[21] Appl. No.: 742,165

[22] Filed: Nov. 15, 1976

[51] Int. Cl.² .................................... B29D 7/14
[52] U.S. Cl. ...................... 156/244.16; 156/324; 428/909
[58] Field of Search ............ 156/243, 244, 324, 277; 428/909; 101/401.1, 401.3

[56] References Cited

U.S. PATENT DOCUMENTS

| | | | |
|---|---|---|---|
| 1,096,112 | 5/1914 | Kush | 428/909 |
| 1,952,038 | 3/1934 | Fischer | 156/244 |
| 2,285,763 | 6/1942 | Vasel | 428/909 |
| 2,452,821 | 11/1948 | Wood | 101/401.1 |
| 2,792,321 | 5/1957 | Fredericks | 428/909 |
| 2,795,521 | 6/1957 | Blackford | 156/244 |
| 3,235,772 | 2/1966 | Gurin | 428/909 |
| 3,360,415 | 12/1967 | Hellman et al. | 156/324 |
| 3,486,961 | 12/1969 | Adams | 156/324 |

FOREIGN PATENT DOCUMENTS

| | | | |
|---|---|---|---|
| 530,623 | 8/1954 | Belgium | 156/277 |
| 636,007 | 2/1962 | Canada | 428/909 |
| 555,112 | 4/1958 | Canada | 156/244 |
| 641,568 | 8/1950 | United Kingdom | 156/244 |

*Primary Examiner*—Caleb Weston
*Attorney, Agent, or Firm*—Reuben Wolk

[57] ABSTRACT

A method of continuously making a printing blanket construction is provided and comprises the steps of supporting a substrate web in coil form for unwinding rotation, unwinding and moving the forward portion of the substrate web through a laminating station, and laminating a polymeric layer adjacent the substrate web at the station wherein the polymeric layer may serve as a printing face or the method may comprise the process of forming a printing face adjacent the polymeric layer.

4 Claims, 10 Drawing Figures

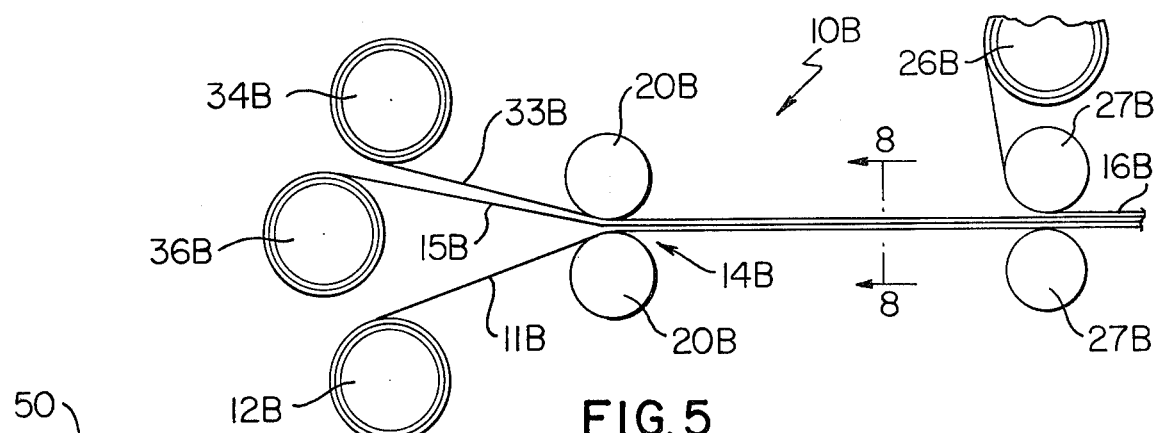
FIG. 5
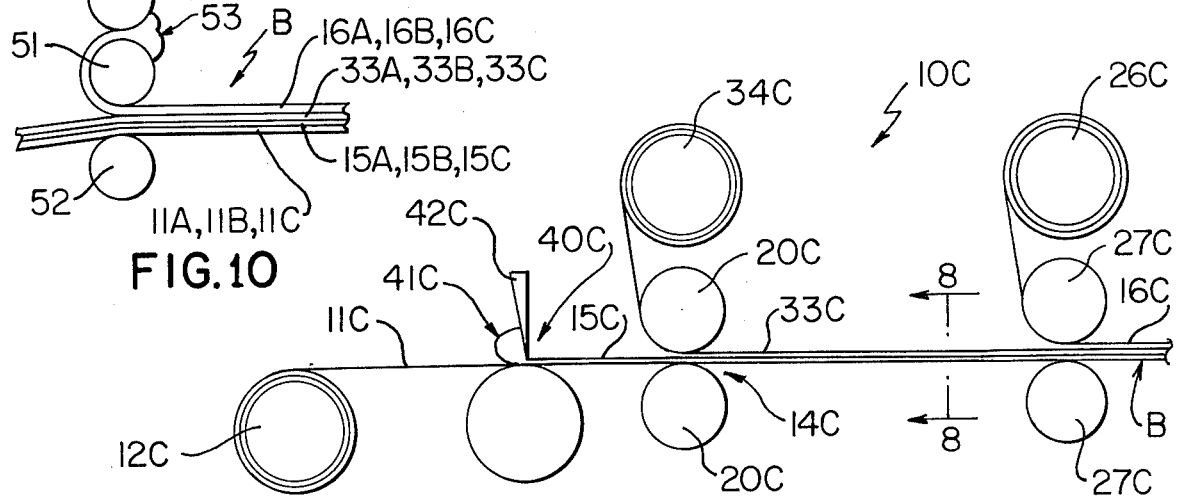
FIG. 10
FIG. 6
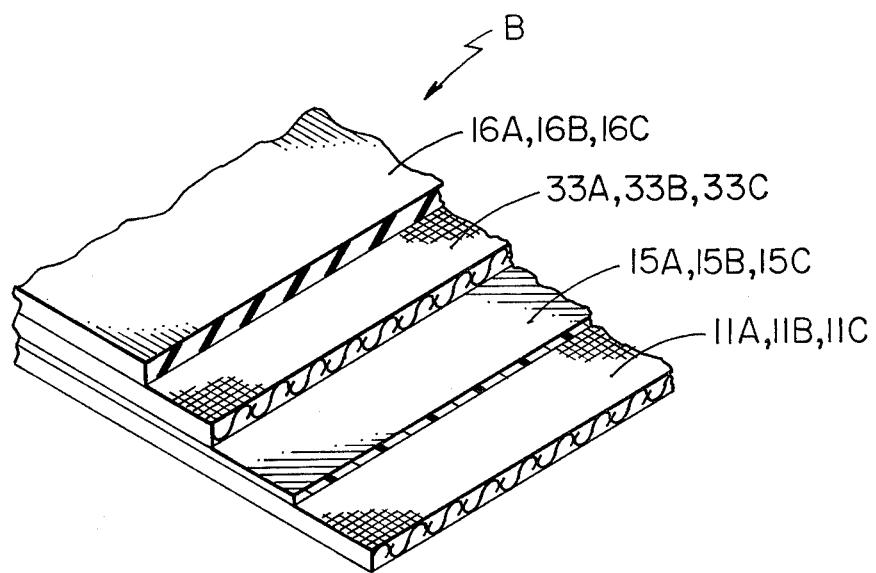
FIG. 7

METHOD OF CONTINUOUSLY MAKING A PRINTING BLANKET CONSTRUCTION

BACKGROUND OF THE INVENTION

This invention relates to printing blankets and in particular to a method of making a printing blanket construction in a continuous manner or process.

Printing blankets comprised of a plurality of laminated layers are well known and widely used throughout the printing industry; and, such blankets are often used in offset lithographic printing where the function of such blankets is to transfer printing ink from associated printing plates to articles being printed.

Printing blankets of laminated construction produced by presently known techniques and methods are generally comparatively expensive due to the comparatively large number of operations required in first forming the various blanket layers and then laminating such layers together to provide the desired blanket characteristics. In particular, the processes or methods currently used in manufacturing or making such printing blankets require considerable manufacturing time; result in the generation of excessive scrap and particularly scrap which cannot be recycled; require numerous auxiliary operations such as mill processing, churning, drying, and the like; and create considerable air pollution due to the evaporation of solvents, adhesive means, and the like, employed in the lamination process.

SUMMARY

It is a feature of this invention to provide a simple and economical method of making a printing blanket construction in a minimum of manufacturing time, with optimum utilization of blanket construction materials and minimum scrap which can be recycled, with few auxiliary operations of the character mentioned, and substantially without or with minimum air pollution.

Another feature of this invention is to provide a method of making a printing blanket construction which is particularly adapted to have a printing face defined thereon continuously or, if desired, by conventional processes.

Another feature of this invention is to provide a method of making a printing blanket construction which is continuous and substantially uninterrupted.

Another feature of this invention is to provide a method of continuously making a printing blanket construction comprising the steps of, supporting a substrate web in coil form for unwinding rotation, unwinding and moving a forward portion of the substrate web through a laminating station, laminating a polymeric layer against the substrate web at such station, and forming a printing face adjacent the polymeric layer.

Accordingly, it is an object of this invention to provide a method of making a printing blanket construction having one or more of the novel features set forth above or hereinafter shown or described.

Other details, features, objects, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 5 is a view similar to FIG. 1 illustrating still another example of the method of this invention;

FIG. 6 is a view similar to FIG. 1 illustrating yet another example of the method of this invention;

FIG. 7 is a fragmentary perspective view of a blanket construction which may be made by the method as presented in FIGS. 4, 5 or 6;

FIG. 10 is a schematic view with parts in elevation and parts broken away particularly illustrating the manner in which the blanket construction of FIG. 8 may have a printing face defined thereon by calendering action employing a so-called skim unit to define a blanket construction that is substantially identical to the blanket construction of FIG. 7.

DESCRIPTION OF ILLUSTRATED EMBODIMENTS

Figure 1:
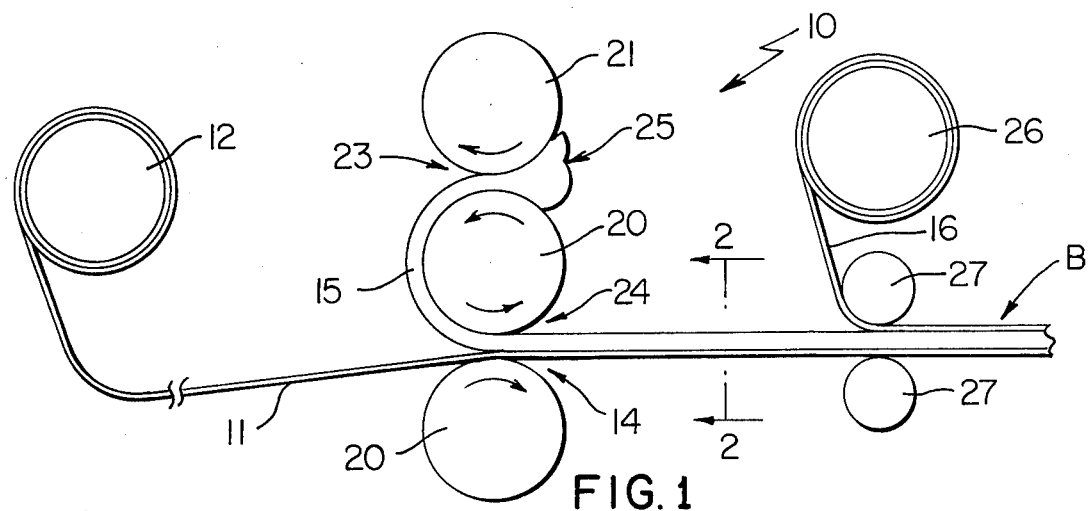
FIG. 1 is a fragmentary schematic view primarily in elevation particularly illustrating one example of the method of continuously making a printing blanket construction in accordance with this invention.
Figure 3:
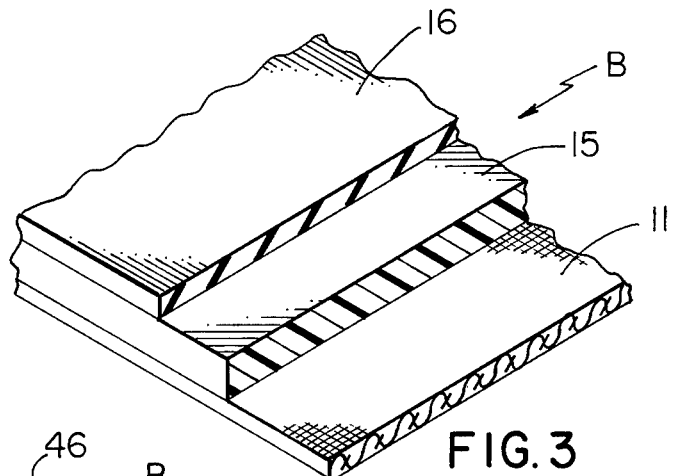
FIG. 3 is a fragmentary perspective view of a printing blanket construction made by the method of FIG. 1.

Reference is now made to FIG. 1 of the drawings which illustrates one exemplary embodiment of the method of this invention used in continuously making a printing blanket construction and such method is designated generally by the reference numeral 10. The method 10 comprises the steps of supporting a substrate web 11 in coil form on a suitable coil 12 thereof for unwinding rotation and in a manner which is well known in the art; and, a forward or leading end portion of the substrate web is then moved through what will be referred to as a laminating station 14 where a polymeric layer 15 is laminated against the substrate web in a manner to be described in more detail subsequently. A printing layer or face 16 is then formed adjacent the polymeric layer and in this example the printing face 16 is formed by uniting a rubber layer, also designated by the reference numeral 16, against the polymeric layer 15 to complete the printing blanket construction which is designated by the letter B in FIGS. 1 and 3.

The polymeric layer 15 is laminated against the substrate web at the laminating station 14 employing a pair of laminating or compression rollers 20 an upper one of which is a dual-purpose (calendering and compression) roller and a lower one of which is disposed in supporting relation beneath the substrate web 11. The upper one of the pair of rollers 20 at station 14 serves as a calendering roller as mentioned and cooperates with a calendering roller 21 disposed thereabove to define the polymeric layer 15 at one circumferential position of the upper roller 20 as shown at 23. The lamination of the polymeric layer 15 is achieved by laminating such layer with the upper roller 20 at a circumferential position 24 which is diametrically opposite the position 23.

Figure 2:
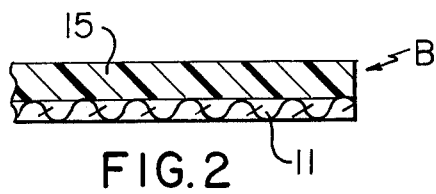
FIG. 2 is a fragmentary cross-sectional view taken essentially on line 2—2 of FIG. 1.

The calendering roller, comprised of upper roller 20 and roller 21, are provided with a suitable polymeric material as shown at 25 and the calendering of such material is achieved as is well known in the art to define the polymeric layer 15. The blanket construction defined at the laminating station 14 is illustrated in FIG. 2 and is comprised of the substrate web 11 and the polymeric layer 15.

As mentioned above, a layer of polymeric material preferably in the form of rubber is formed adjacent the polymeric layer 15 to define the printing face 16. In this example of the method of this invention, a layer or web 16 is provided in coil form as a coil 26 thereof and suitably supported for unwinding rotation at a position downstream of the laminating station 14. The printing face or web 16 is united against the polymeric layer 15 downstream of the laminating station 14 employing a pair of cooperating compression rollers each designated by the same reference numeral 27. After uniting the rubber layer or printing face 16 with the compression rollers 27 the resulting construction is in the form of the printing blanket construction B illustrated in FIG. 3 having a substrate web 11, polymeric layer 15, and rubber layer or printing face 16.

If desired, any adhesive means known in the art may be provided between the polymeric layer 15 and the rubber layer 16 to assure provision of a unitary laminated structure. Also, it may be preferred to provide suitable internal means such as steam or electrical heaters, for example, for heating the compression rollers to a sufficient temperature which when acting upon the selected compatible polymeric materials used to define the layers 15 and 16 results in a high strength bond and unitary structure for the completed blanket construction B.

It will also be appreciated that instead of uniting rubber layer 16 against the polymeric layer 15 from a web of rubber 16 as shown in FIG. 1, the rubber layer or printing face 16 may be formed by applying a plurality of coats of uncured rubber against the polymeric layer 15 essentially in the manner presently employed in the art to define a printing face and then suitably curing the coats of rubber to complete such printing face 16. The web 16 of rubber material provided as a coil 26 thereof may be a partially cured or substantially uncured web which may be laminated to layer 15 by rollers 27 or similar rollers and then such partially cured or uncured layer may be cured by passing same through a heated environment such as a heat tunnel, or the like, under controlled temperature and pressure conditions to complete the blanket B in a continuous process. The completed blanket B may then be suitably wound on a take-up or supply roll thereof.

Figure 2A:
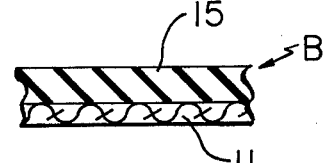
FIG. 2A is a view similar to FIG. 2 showing a blanket construction made by the method of this invention to highlight that such method may comprise simply continuously calendering a rubber face against a substrate.

A modification of the method of this invention comprises, in essence, defining a two-ply construction as shown in detail in the forward portion of FIG. 1 upstream of the section line 2—2 by calendering the polymeric layer 15 which may be in the form of a suitable rubber compound as shown in FIG. 2A employing the pair of laminating compression rollers 20 at the laminating station 14 as shown in FIG. 1. The polymeric layer calendered at the station 14 is achieved in a continuous manner and defines the completed blanket construction B of FIG. 2A without the need of applying a polymeric material or layer in the form of a printing face or layer 16 as shown in the downstream portion of FIG. 1.

The above described technique of calendering the polymeric layer in the form of rubber layer 15 in position is often referred to as a skim process and uncured or partially cured rubber is placed in layer form on the substrate. Cooperating rollers are often sold as a unit and referred to as a "skim unit" to provide this type of operation. Once the rubber layer is calendered in position it is cured by passing same through a suitable controlled temperature and pressure environment.

It will also be appreciated that the construction shown in FIG. 2 and comprised of substrate web 11 and polymeric layer 15 made of plastic material may be the entire blanket construction B. In this instance the plastic layer 15 is made of a material suitable for a printing face layer of a printing blanket construction.

Figure 4:
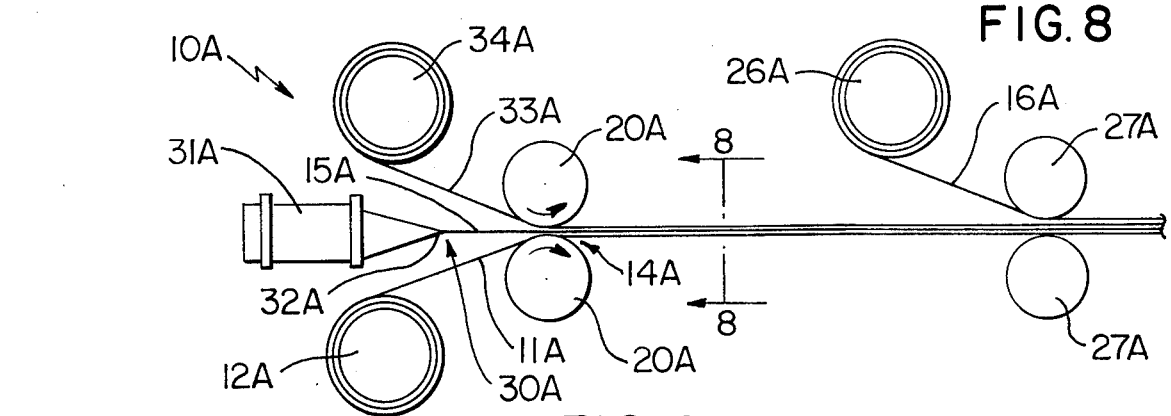
FIG. 4 is a view similar to FIG. 1 illustrating another example of the method of this invention.

Other examples of the method of this invention are illustrated in FIGS. 4, 5, and 6 of the drawing. The examples of the method illustrated in FIGS. 4, 5, and 6 are very similar to the example of FIG. 1; therefore, such examples will be designated generally by the reference numerals 10A, 10B, and 10C respectively and representative steps, associated apparatus, and components of the blanket construction being defined which are similar to corresponding items presented in FIG. 1 will be designated in the drawing by the same reference numerals as in FIG. 1 (whether or not such representative items are mentioned in the specification) followed by the associated letter designation A, B, or C and not described again in detail. Only those component items or steps which are different from corresponding ones illustrated in FIG. 1 will be designated by a new reference numeral also followed by their associated letter designation and described in detail.

The method 10A of FIG. 4 discloses the laminating step which is comprised of the step of extruding a layer of polymeric material as shown at 30A to define a polymeric layer 15A against a substrate web 11A (unwound from a coil 12A) employing a suitable extrusion apparatus 31A having controlled outlet means at 32A which produces a controlled thickness of polymeric material which defines polymeric layer 15A as a controlled thickness layer. The method of 10A also comprises the step of bonding a reinforcing layer 33A against the polymeric layer 15A at the laminating station 14A employing a pair of cooperating compression or laminating rollers 20A. The reinforcing layer 33A is provided as a web in coil form on a coil 34A thereof and supported for unwinding rotation adjacent the laminating station 14A. The lamination of the polymeric layer 15A against the substrate web 11A and the bonding of the reinforcing layer 33A against the polymeric layer 15A are achieved in a simultaneous manner at the laminating station 14A between the compression rollers 20A, also see FIG. 8.

A layer of a suitable rubber defining printing face 16A may be suitably laminated against the top surface of the reinforcing layer 33A employing a pair of cooperating compression rollers 27A (which may be heated) in a similar manner as disclosed in FIG. 1. The web or printing face 16A may be provided in coil form on a coil 26A thereof at a location downstream of the laminating station 14A.

Figure 8:
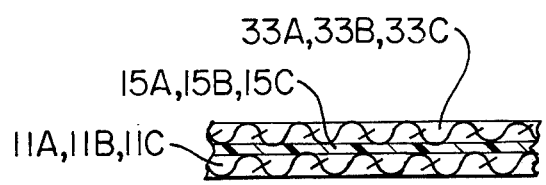
FIG. 8 is a typical fragmentary cross-sectional view as taken on the line 8—8 of any one of FIGS. 4, 5, or 6 to illustrate a typical blanket construction which is shown without a printing face having been formed thereon.

The method 10B of FIG. 5 discloses that the laminating step is comprised of the step of disposing a preformed sheet 15B of polymeric material against a substrate layer or web 11B (unwound from a coil 12B) to define the polymeric layer 15B and the sheet is provided in coil form or as a coil 36B thereof adjacent the laminating station 14B. The method 10B comprises the step of bonding a reinforcing layer 33B against the polymeric layer or sheet 15B and the reinforcing layer 33B is provided in coil form as a coil 34B thereof adjacent the laminating station 14B. The lamination is achieved at the laminating station 14B by sandwiching the polymeric sheet or layer 15B between the substrate web 11B and the reinforcing layer 33B employing a pair of cooperating compression rollers 20B; and, the laminated construction thus defined is illustrated in FIG. 8 of the drawings. The lamination of webs 11B, 15B, and 33B is achieved in a simultaneous manner at the laminating station 14B.

In the method 10B a layer of a suitable rubber material defining the printing face 16B may also be bonded or suitably laminated against the top surface of the reinforcing layer 33B employing a pair of cooperating compression rollers 27B. The printing face 16B may be defined employing a web of a suitable rubber material which is provided in coil form and supported as a coil 26B thereof for unwinding rotation downstream of the laminating station 14B.

The method 10C illustrated in FIG. 6 discloses a laminating step at a laminating station 14C and the laminating step comprises providing a thickness of a suitable resin as indicated at 40C to define the polymeric layer 15C against the substrate web 11C which is provided from a coil 12C thereof. The step of providing the thickness of resin is indicated at 40C and is achieved by applying a volume of such resin as shown at 41C on the substrate web 11C upstream of a doctor blade 42C and controlling the horizontal position of such doctor blade in a manner that is well known in the art to provide a controlled thickness of the resin which defines the polymeric layer 15C.

The method 10C also comprises bonding a reinforcing layer 33C against the polymeric layer 15C at the laminating station 14C again employing a pair of cooperating compression rollers 20C; and, the reinforcing layer 33C is provided as a web and in coil form or as a coil 34C thereof which is supported for unwinding rotation adjacent the laminating station 14C. In addition, the method 10C comprises the step of bonding a rubber layer or printing face 16C against the top surface of reinforcing layer 33C again employing a pair of cooperating compression rollers 27C. The rubber layer 16C is provided in coil form as a coil 26C thereof.

The method steps disclosed in the methods 10A, 10B, and 10C result in the provision of a printing blanket B as illustrated in FIG. 7 having a substrate web which is designated by the reference numeral 11A, 11B, or 11C; a polymeric layer 15A, 15B, or 15C; a reinforcing layer 33A, 33B, or 33C; and a printing face of layer 16A, 16B, or 16C. Similarly the intermediate blanket construction, prior to applying printing face thereon, is shown in FIG. 8 and is comprised of substrate web 11A, 11B, or 11C; polymeric layer 15A, 15B, or 15C; and reinforcing layer 33A, 33B, or 33C. It will be appreciated that in the blanket construction illustrated in each of FIGS. 7 and 8 the various layers with the letter designation A are suitably laminated to define the blanket construction B defined by the method 10A of FIG. 4, the various layers with the letter designation B are suitably laminated to define the blanket construction B defined by the method 10B of FIG. 5, and the various layers with the letter designation C are suitably laminated to define the blanket construction B made by the method 10C of FIG. 6.

The printing face as defined by each of the methods 10A, 10B and 10C need not necessarily be made by laminating or uniting a thickness of rubber against a reinforcing layer utilizing suitable heated compression rollers, or the like.

For example, such compression rollers may be unheated and if heating of the layer or web defining the printing face is required for bonding and/or curing purposes, such further heating may be achieved downstream of the compression rollers in accordance with any technique known in the art.

Figure 9:
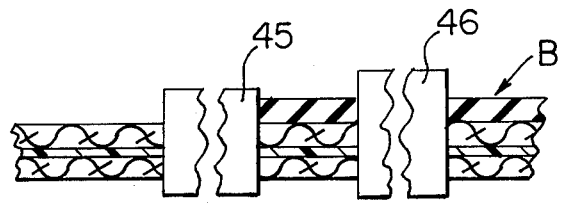
FIG. 9 is a view with parts shown in cross section, parts in elevation, parts broken away, and parts shown schematically particularly illustrating the manner in which the blanket construction of FIG. 8 may have a printing face defined thereon in a known conventional manner to complete the blanket construction so that it is substantially identical to the blanket construction of FIG. 7.

It will also be appreciated that after defining a blanket construction as illustrated in FIG. 8 the rubber layer or printing face may be defined by conventional techniques. In particular, and as shown in FIG. 9, a blanket construction may be defined by suitably applying on a top reinforcing layer a plurality of thicknesses of rubber utilizing conventional or known techniques as illustrated by the block at 45. After the desired thickness of the printing face is obtained which may be substantially the same thickness as the thickness of the printing face illustrated in FIG. 7 the resulting construction may be passed through a suitable heated environment such as a heat tunnel 46 and cured to complete a blanket construction B which is substantially identical to the blanket construction B of FIG. 7.

The polymeric layer 15, 15A, 15B or 15C of each blanket construction B of this invention, regardless of the manner in which such layer is formed, may be any suitable polymeric material known in the art. One example of a material which may be used for layers 15, 15A and 15B is a thermoplastic rubber sold under the registered trademark TPR by the Uniroyal Chemical Division of Uniroyal Incorporated, EMIC Building, Naugatuck, Conn. 06779. TPR thermoplastic rubber is from a family of polyolefin thermoplastic rubbers that combine fast manufacturing times of thermoplastics with the properties of a true rubber. TPR rubber of the type that may be used to define a printing blanket has a hardness as determined on the Shore Durometer, A scale, ranging between 65 and 95; and TPR rubbers remain flexible and useable at temperatures ranging from minus 60° F. to plus 300° F.

The polymeric adhesive layer 15C disclosed in the method of 10C of FIG. 6 may also be made of any suitable polymer known in the art and an example of a material in the form of a thermosetting resin which has been used successfully is manufactured by DeSoto, Inc., Gulf Plastics Plant, 206 Culley Dr., Jackson, Miss. 39206 under the trade designation LF-188. The LF-188 adhesive material is self-curing. Because the LF-188 resin is self-curing the completed laminated construction has strength adequate for cutting, folding, etc. after 48 hours and its full strength of bond is reached after about 7 days.

The polymeric layer 15C may also be a resin sold under the trade designation Uvithane 782 by Thiokol Corp., Box 1296, Trenton, N.J. 08607. This resin is preferably cured by radiation immediately after its application,—either as an exposed face layer or a sandwiched layer. An industrial 60 inches wide curing unit is available for radiation curing using an "electron beam" device and is sold by Energy Sciences Inc., Burlington Rd., Bedford, Mass. 01730, under the trade designation Electrocurtain.

The polymeric layers 15A and 15B may also be made of a thermoplastic urethane polymer sold under the registered trademark of Q-Thane PH-56, by the K. J. Quinn & Co., Inc., 195 Canal St., Malden, Mass. 02148. This material which was used successfully in laboratory trials has a Shore Durometer hardness ranging between 70 and 75 on the A scale and when comparing it to the above-described TPR rubber provides higher bond strength than TPR and about the same handling and processing properties.

It may also be possible to use a thermosetting material for the layer 15 and this could be done by unwinding a film 15B and laminating such film between layers 11B and 33B by curing such film using hot rollers 20B. The film layer 15B may be 2-4 mils thick. A thermosetting film material of this character is sold by Daubert Chemical Co., 4700 So. Central Ave., Chicago, Ill. 60638.

The substrate webs 11, 11A, 11B, and 11C and the reinforcing webs or layers 33A, 33B, and 33C may be made of any suitable material known in the art and preferably are made of fabric materials including woven, non-woven, and the like.

In the disclosure of the invention illustrated in FIGS. 1, 4, 5, and 6 of the drawings it will be seen that a layer of suitable uncured or partially cured rubber material defining the printing face is unwound from a web thereof which is provided in coil form and laminated in position. However, it will be appreciated that the rubber face may be defined by calendering in position uncured or partially cured rubber and to highlight this point reference is made to FIG. 10 of the drawings which illustrates a plurality of cooperating rollers 50, 51, and 52 referred to as a skim unit and such rollers may be used in defining the printing face of any of the blanket constructions B. For example, a suitable polymeric material in the form of rubber may be provided as at 53 and calendered against the top surface of adjoining supporting layers whereby each of the blanket constructions B may be comprised of a plurality of layers as shown and with such layers being substantially identical to such layers as shown in FIG. 7. Once one or more uncured rubber layers are suitably calendered in position to define a printing face, such face is suitably cured to complete the blanket construction.

It will also be appreciated that in calendering a face layer on a blanket construction the calendering action may be achieved by applying a comparatively thick face in one pass or by applying comparatively thin layers in a plurality of passes. Similarly, instead of bonding a single rubber face in position as shown in FIGS. 1, 4, 5, and 6, the rubber face may be defined by bonding together a plurality of successively applied layers.

The printing face comprising the blanket construction has been shown in the drawings by cross-hatching as being made of rubber; and, it will be appreciated that any suitable rubber may be employed for this purpose. However, in some applications, a suitable polymeric material in the form of a synthetic plastic material may be employed to define the printing face.

In view of the above description, it will be seen that this invention provides a method of continuously making printing blanket constructions at considerable cost savings and without requiring specialized equipment.

While present examples of the method of this invention, and blanket constructions made using same, have been illustrated and described, it will be recognized that this invention may be otherwise practiced within the scope of the following claims.

What is claimed is:

1. A method of continuously making a printing blanket construction comprising the steps of, supporting a fabric substrate web in coil form for unwinding rotation, unwinding and moving a forward portion of said substrate web through a laminating station, continuously laminating a thermoplastic polymeric layer against said substrate web at said station, continuously bonding a reinforcing layer against said polymeric layer, and continuously calendering a printing face against said reinforcing layer.

2. A method as set forth in claim 1 in which said laminating and bonding steps are achieved simultaneously at said laminating station.

3. A method as set forth in claim 2 in which said bonding step comprises unwinding said reinforcing fabric from a web thereof supported in coil form for unwinding rotation adjacent said laminating station.

4. A method as set forth in claim 2 in which said laminating station is defined by a pair of pressure-applying rollers and including the step of extruding a controlled thickness of said polymeric material from an extrusion apparatus having controlled outlet means therein through which said polymeric material is extruded, and extruding said material against said substrate web to define a polymeric layer.

* * * * *